(12) United States Patent  
Sonnenberg (10) Patent No.: US 8,443,842 B2  
(45) Date of Patent: May 21, 2013

(54) FLOW STRAIGHTENER FOR A FLOWMETER, IN PARTICULAR AN ULTRASONIC METERING DEVICE

(75) Inventor: Hans-Michael Sonnenberg, Ansbach (DE)

(73) Assignee: Hydrometer GmbH, Ansbach (DE)

( * ) Notice: Subject to any disclaimer, the term of this patent is extended or adjusted under 35 U.S.C. 154(b) by 902 days.

(21) Appl. No.: 12/571,786

(22) Filed: Oct. 1, 2009

(65) Prior Publication Data

US 2010/0084034 A1    Apr. 8, 2010

(30) Foreign Application Priority Data

Oct. 2, 2008  (DE) .......................... 10 2008 049 891

(51) Int. Cl.  
*F15D 1/04* (2006.01)

(52) U.S. Cl.  
USPC .............................. 138/44; 138/40; 73/204.21

(58) Field of Classification Search  
USPC ............ 138/44, 40; 73/204.21, 204.26; 137/8  
See application file for complete search history.

(56) References Cited

U.S. PATENT DOCUMENTS

| | | | | |
|---|---|---|---|---|
| 3,572,361 A * | 3/1971 | Hirsch | ............................. | 137/92 |
| 4,365,518 A | 12/1982 | Zacharias, Jr. | | |
| 5,529,093 A * | 6/1996 | Gallagher et al. | .............. | 138/44 |
| 5,918,279 A * | 6/1999 | Hecht et al. | ................. | 73/204.21 |
| 6,145,544 A * | 11/2000 | Dutertre et al. | .................. | 138/39 |
| 6,186,179 B1 * | 2/2001 | Hill | .................. | 138/39 |
| 7,370,675 B2 * | 5/2008 | Cancade et al. | ................ | 138/45 |
| 7,845,688 B2 * | 12/2010 | Gallagher et al. | ............. | 285/412 |

FOREIGN PATENT DOCUMENTS

| | | |
|---|---|---|
| DE | 32 39 770 | 5/1984 |
| DE | 196 47 081 | 5/1998 |
| DE | 196 52 753 | 6/1998 |
| DE | 103 27 076 | 4/2005 |
| DE | 10 2004 010 408 | 9/2005 |

\* cited by examiner

*Primary Examiner* — Patrick F Brinson  
(74) *Attorney, Agent, or Firm* — Lucas & Mercanti, LLP (57) ABSTRACT

Flow straightener for a flowmeter, in particular an ultrasonic metering device, which can be fitted into a flow pipe which is upstream of or in the flowmeter and through which the fluid to be measured flows with a main direction of flow (H), comprising a number of vanes (11, 12, 16, 17), which each have surfaces (13) that are parallel to one another and, in the fitted position, run parallel to the main direction of flow (H) of the fluid to be measured, the vanes (11, 12, 16, 17) being arranged in such a way that, in the fitted position, the flow cross section (Q) of the fluid-carrying flow pipe is subdivided into a number of partial cross sections ($TQ_{1,2,3,4,5}$), at least some of the partial cross sections ($TQ_{1,2,3,4,5}$) being of different sizes.

18 Claims, 9 Drawing Sheets

FLOW STRAIGHTENER FOR A FLOWMETER, IN PARTICULAR AN ULTRASONIC METERING DEVICE

This application claims the priority of DE 10/2008 049 891.2 filed Oct. 2, 2008, which is incorporated by reference herein.

The invention relates to a flow straightener for a flowmeter, in particular an ultrasonic metering device, which can be fitted into a flow pipe which is upstream of or in the flowmeter and through which the fluid to be measured flows with a main direction of flow.

When recording measured information from a flowing fluid, for example water, by means of a flowmeter, such as an ultrasonic meter or else a single-jet or Woltman meter, the inflow profile of the fluid into the area where the measured data are acquired has a not inconsiderable influence on the measuring accuracy. The measuring accuracy is, however, one of the central features of such a device, which is intended to be as exact as possible. It has been found in studies that one of the principal causes for measuring inaccuracy in the case of an undisturbed flow profile is the region where a flow changes over between laminar and turbulent in a narrow flow area. In this case, the core flow is mainly responsible for the measuring effect of the meter. In the case of an undisturbed flow profile, that is to say when it is unswirled, there is a relatively quick, to some extent abrupt, change from a "rectangular" turbulence profile to a parabolic laminar profile, which causes a disproportionate increase in the core flow. This results in differences in the flow velocity, which ultimately lead to the measuring inaccuracies. Especially in the case of modern meter designs, such as for example an ultrasonic meter with a jet of a U-shaped form, with which the flow scarcely undergoes any deflection, there is particular sensitivity to these flow phenomena.

In order to "destroy" the laminar flow profile or the laminar flow to avoid measuring inaccuracies, it is known to use flow straighteners or swirling elements. One such element is described, for example, in EP 1 775 560 A2. There, short inwardly projecting projections that are twisted in the manner of a propeller are provided on an outer ring of the flow straightener, so that they are at an angle to the main direction of flow. As a result, the flow undergoes a deflection, it is swirled. However, this is problematic especially at higher flow velocities, since it results in a high flow resistance and causes secondary flows, which in turn have an adverse effect on the measuring accuracy.

The invention is consequently based on the problem of providing a flow straightener which allows an increase in the measuring accuracy, in particular in the transitional region from laminar flow to turbulent flow, without having the disadvantages that typically arise at higher flow velocities.

To solve this problem, a flow straightener of the type mentioned at the beginning is provided, comprising a number of vanes, which each have surfaces that are parallel to one another and, in the fitted position, run parallel to the main direction of flow of the fluid to be measured, the vanes being arranged in such a way that, in the fitted position, the flow cross section of the fluid-carrying flow pipe is subdivided into a number of partial cross sections, at least some of the partial cross sections being of different sizes. When a straight flow pipe is used, the direction of the pipe is also the main direction of flow, so that with such a construction of a meter the surfaces of the vanes are parallel to the axis of the pipe.

According to the invention, an unsymmetrical vane arrangement is provided, chosen such that the flow cross section is subdivided into a number of partial cross sections that are closed when considered in cross section. The vane arrangement is in this case devised in such a way that the partial cross sections differ in their size and/or in their shape. What is important about this asymmetrical arrangement is that the Reynolds effective geometrical dimensions are different. The vanes themselves are made longer than they are wide when considered in the main direction of flow. The partial cross sections of different sizes then advantageously cause different behavior for laminar flow and turbulent flow, since the Reynolds effective dimensions have the effect that the partial cross sections have their changeover point from laminar to turbulent at different flow velocities. With turbulent flow, the cross-sectionally considered velocity distribution into small and large partial cross sections remains approximately the same, that is to say the fluid can pass the flow straightener without disturbing secondary flows being produced. With laminar flow, that is to say with lower through-flow, there are however different flow velocities as a result of the different partial cross sections, that is to say the fluid no longer flows uniformly through the flow straightener, since the partial cross sections with smaller geometries allow disproportionately less fluid through. In the region of smaller partial cross sections, smaller flow velocities form than in the case of larger partial cross sections. There are therefore locally different flow velocities, which break up the laminar profile downstream of the flow straightener. This is a result of the fact that, because of the parallel vane surfaces, the region of wall flow predominates in cases of smaller geometries and the middle main flow predominates in cases of larger geometries. Therefore, considered over the complete cross section, this ultimately results in different partial cross-section-related flow profiles with different flow rates or flow velocities. This has the effect that swirling of the laminar flow profile or of the laminar flow occurs, while a turbulent flow can pass the vanes or the flow straightener virtually undisturbed. Because of the parallel alignment of the vanes or surfaces, also a) there is no appreciable pressure loss and b) there are no induced secondary cross-flows, as there are in the case of comparable prior-art systems, as described at the beginning. If the vanes were not arranged in such a way that, as provided according to the invention, the partial cross sections of different sizes are produced, a locally differing flow, or locally differing cross-section-related through-flows, when considered over the complete flow cross section, would not occur, for example due to a uniform arrangement, since all the partial cross sections and the thereby defined through-flows or flow profiles formed downstream thereof would be approximately the same. There would consequently be no flow differences downstream of the flow straightener; consequently, there would not be the breakup of the laminar flow that is possible with the flow straightener according to the invention.

As already described, according to the invention the vanes are longer than they are wide when considered in the main direction of flow. This has the effect on the one hand that onflow surfaces that are as narrow as possible and small in terms of surface area are obtained on the end faces of the vanes, while on the other hand relatively long guiding surfaces for the flow, lying parallel to the main direction of flow, are obtained and prevent induced cross-flow, are responsible for forming the laminar or static flow component in the case of laminar flow and by way of which, inter alia, the different partial-cross-section-related flow velocities or flow rates are defined. In order to be able to reduce the resistance to oncoming flow still further, it is expedient if the vanes have a bevel or a rounding on their onflow side, that is to say are made with a slightly beveled or rounded face.

A particularly advantageous development of the invention envisages arranging the vanes in two or more cross-sectional planes lying one behind the other, this applying with respect to the main direction of flow. That is to say that the vanes from the two planes, which preferably lie one directly behind the other, act together and bring about the dividing up or swirling of the laminar flow. At the same time, a particularly advantageous development of the invention envisages that the vanes arranged in planes lying one behind the other run parallel to one another, at least in certain portions. This configuration leads to a kind of "staircase formation". For example, a vane arranged in the front plane, when considered in the direction of outflow, is located somewhat closer to the middle of the pipe than a vane located in the second plane lying behind the first, which vane is as it were offset in relation to the first vane, ultimately indeed in the manner of a stair or step. This has the result that alternating narrow and wide slits can be formed, defined by way of the vanes of the two planes arranged one behind the other, a greater through-flow being possible through the wider slits than through the narrow slits, which may even be designed in such a way that, because of the static flow component, only a minimal through-flow is obtained.

Because of the different cross-section-related, or here slit-related, through-flows, there is in turn good swirling downstream of the flow straightener. In addition, influencing of the direction of flow may also take place by way of this "staircase formation". This is so because the vanes ultimately deflect the flow in a way corresponding to the direction of the "staircase formation", which brings about an additional swirling effect.

In order to improve this additional swirling effect still further, a development of the invention envisages that the vanes run parallel to one another in their middle region and the adjacent vane portions of two vanes lying one behind the other run at an angle to one another. With this vane geometry, different directions of deflection are obtained toward the periphery of the flow straightener, or toward the periphery of the flow pipe, since the vane spacing changes, that is to say a vane of the front plane comes closer to a vane of the rear plane or the two vanes diverge. This has the effect that, because of this angled vane guidance, a twist of the flow takes place peripherally, and this is used as an additional deflecting or influencing effect, in other words there is at the same time a kind of peripheral swirl formation.

In principle, there is the possibility of arranging the vanes in a ring delimiting the flow straightener on the outside and connecting them to the ring by both ends, as it were without any central securement in the middle. It is also conceivable, however, to provide at least one holding crosspiece running substantially perpendicular to the vanes or vane portions that are parallel to one another, to which crosspiece the vanes or vane portions are connected. This holding crosspiece, arranged for example in the middle or running through the middle, is likewise longer than it is wide when considered in the main direction of flow; it contributes equally to the influencing of the flow profile or the flow, in that it is of course likewise of a partial cross-section-forming nature. The holding crosspiece may also have at least over certain portions on the onflow side and/or the opposite side a sloping surface running at an angle <90° to the main direction of flow.

As an alternative to the formation of straight or angled vanes with a straight portion, there is also the possibility that at least some of the vanes are formed as concentric circles connected to at least one holding crosspiece. Used here for example are two circular or annular vanes, which either lie in a common plane or are arranged slightly offset one behind the other in the main direction of flow. The holding crosspiece together with the different radii of the circles or rings can in turn be used to form different partial cross sections, so that the effects and advantages according to the invention are obtained.

A further alternative of the invention envisages that the vanes are formed straight or bent and are connected to at least one holding crosspiece, the straight vanes being at any desired angle >0° and <180° to the holding crosspiece. Therefore, parallelism of the vanes or vane portions is not intended or a prerequisite, but rather the vanes may be arranged as desired on a holding crosspiece and run from the latter at any desired angles, for example to the outer ring, it also being possible for bent vanes, which describe a circular arc, to be formed.

As already described, there is in principle the possibility of accommodating the vanes in a ring delimiting the flow straightener on the outside. As an alternative to this, it is also possible to fix the vanes peripherally by way of two circular peripheral vanes arranged opposite one another. The flow straightener therefore only lies against the inner wall of the pipe by way of these peripheral vanes in the form of segments of a circle; the remaining lateral termination may take place for example by way of straight vanes, which connect the two peripheral vanes lying opposite one another, and which in turn form a partial cross section with the neighboring pipe wall.

Finally, it is also possible as an alternative that peripherally straight vanes are provided, which together make up a rectangular form and in the fitted position are supported on the flow pipe by way of abutting portions.

Here, too, partial cross sections are in turn formed in connection with the inner wall of the pipe by way of these peripheral vanes.

A further alternative configuration is conceivable by providing that the vanes end freely and, in the fitted position, lie with their ends against the flow pipe. Here, too, neither an outer ring nor annular peripheral vanes are provided, but rather the vanes, which are for example arranged on one or two holding crosspieces, run out freely with their ends. In the fitted position, they lie with their ends against the inner wall of the flow pipe, by way of which in turn the partial cross sections are closed or formed.

The flow straightener itself is with preference a plastic injection molding, which makes simple production possible. It is arranged with preference on a pipe insert serving for flow measurement, in particular a reflector holder of an ultrasonic device. This is possible by the flow straightener being fitted on the pipe insert as a separate component by way of a latching connection. In this case, corresponding latching portions are provided on the flow straightener and on the pipe insert. However, it is particularly expedient to mold the flow straightener as an integral part on the pipe insert, which is likewise produced from plastic, consequently therefore to form the flow straightener at the same time as the pipe insert is being produced by injection molding.

Apart from the flow straightener itself, the invention also relates to a flowmeter, in particular an ultrasonic metering device, with a flow pipe through which the fluid to be measured flows with a main direction of flow, and with at least one flow straightener of the type described above inserted in the flow pipe.

Further advantages, features and details of the invention emerge from the exemplary embodiments described below and from the drawings, in which.

Figure 1:
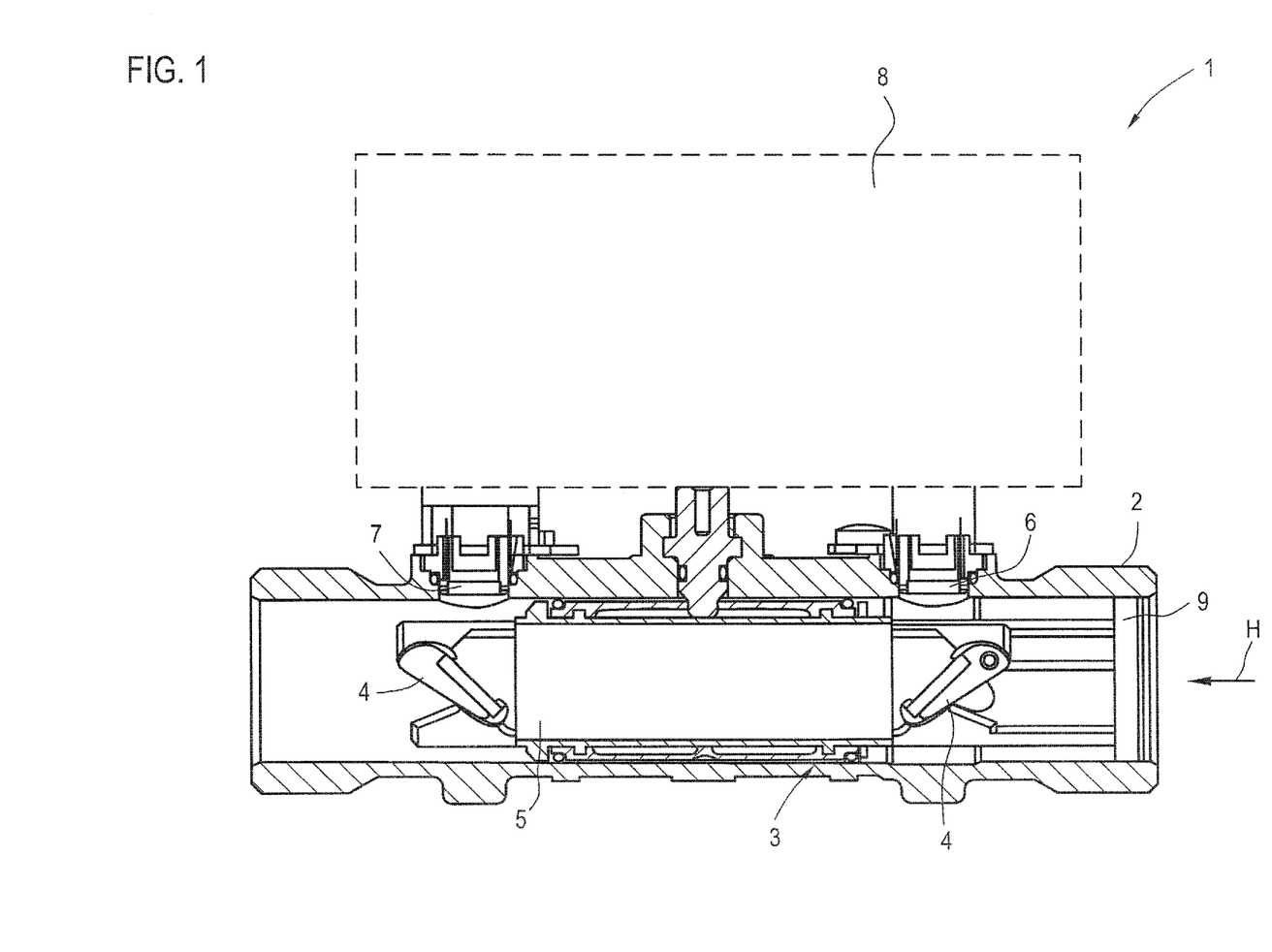
FIG. 1 shows a basic representation, partly in section, of a flowmeter according to the invention with a pipe insert with a flow straightener arranged on it.

FIG. 1 shows a flowmeter 1 according to the invention, here in the form of an ultrasonic metering device, comprising a flow pipe 2, through which a fluid to be measured flows with a main direction of flow, as represented by the arrow H. A pipe insert 3 is provided, comprising two mounts 4 for reflectors, which serve for the reflection of ultrasonic waves that are coupled in and passed through a measuring pipe 5. The ultrasonic waves are produced by way of a first ultrasonic transducer 6 and, after passing through the measuring pipe 5, and consequently through the fluid, are received by a second ultrasonic transducer 7. A downstream electronic evaluation unit 8, only shown here by broken lines, determines the measurement result, which is output by way of a display device or transmission device, etc., that is not shown any more specifically. The basic construction of such an ultrasonic meter is known and need not be explained in any more detail.

Provided at the inlet of the flow pipe 2 is a flow straightener 9, which serves for flow swirling.

Figure 2:
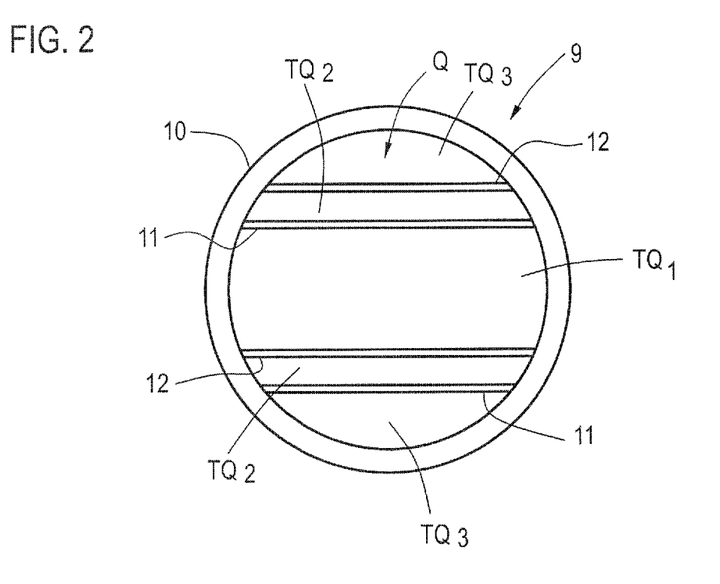
FIG. 2 shows a basic representation of a flow straightener of a first embodiment.

FIG. 2 shows a first embodiment of such a flow straightener 9. This has a ring 10, which delimits the straightener on the outside and in which, in the example shown, a number of straight-running vanes 11, 12 are provided, the vanes 11 being arranged in a first plane and the vanes 12 being arranged in a second plane, see FIG. 3. The vanes 11, 12 run parallel to one another; they are in each case longer than they are wide when considered in the main direction of flow H. Each vane has parallel lateral surfaces 13, which run parallel to the main direction of flow H.

As can be seen, the vanes 11, 12 are arranged in such a way that, acting together, they divide up the complete flow cross section Q into partial cross sections TQ of different sizes. The two vanes 11, 12 arranged more toward the middle form a first partial cross section $TQ_1$, which is larger than the further partial cross sections $TQ_2$ formed between in each case a vane 11 or 12 located more in the middle and the vane 11, 12 neighboring it in the other plane, respectively. Two third partial cross sections $TQ_3$ are realized by way of the respectively outer vanes 11 and 12 and the inner wall of the outer ring 10. Altogether, therefore, three partial cross sections $TQ_1$, $TQ_2$ and $TQ_3$ of different sizes are realized here.

Figure 3:
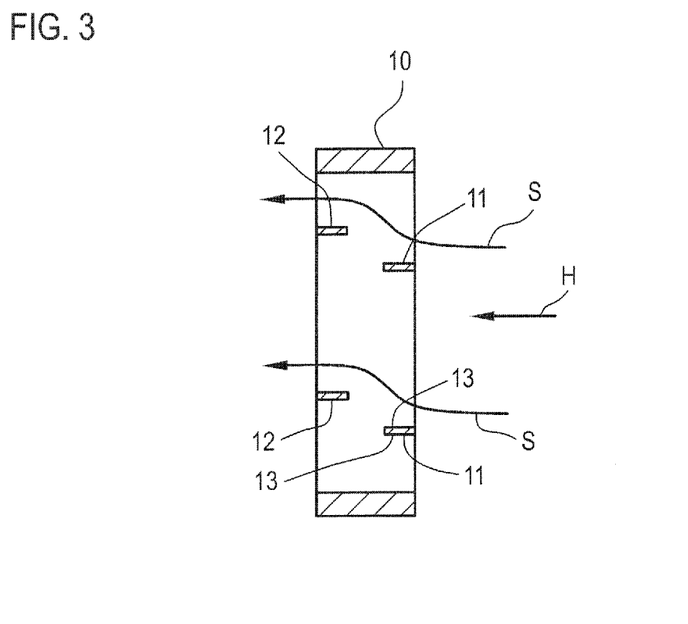
FIG. 3 shows a longitudinal sectional view through the flow straightener from FIG. 2.

Furthermore, the vane arrangement, see FIG. 3, is as it were in the form of a staircase, that is to say, with respect to the horizontal vane arrangement shown here, that the vanes 11 and 12, which are arranged neighboring one another in the two planes, rise up as it were when considered from the main direction of flow H with a horizontal vane path (which is used for the definition of the staircase-like configuration; it goes without saying, however, that the vanes may quite fundamentally run in any desired orientation). This has the effect that the flow S, as indicated by the two arrows in FIG. 3, undergoes as it were an "upward" deflection, that is to say over the staircase formation.

Because of the partial cross sections $TQ_1$-$TQ_3$ of different sizes, different through-flows are obtained in the respective partial cross section TQ in the case of a laminar flow. The smaller a partial cross section TQ is, the smaller the through-flow is, since, because of the relatively large, parallel surfaces 13 of each of the vanes 11, 12, a relatively high static flow component is obtained with respect to the small partial cross section TQ. This means that much less fluid flows through the partial cross sections $TQ_2$ than through the larger partial cross sections $TQ_1$ and $TQ_3$. This has the effect that, considered locally, different flows or flow velocities occur downstream of the flow straightener, which in turn has the effect that the original laminar flow is destroyed and swirling occurs. In addition to this swirling there is the "staircase formation", since a directional component that is conducive to the swirling is additionally obtained by way of the flow.

The configuration may in this case be such that, with laminar flow there is no longer any through-flow through the small partial cross sections $TQ_1$, that is if the vanes lying one behind the other are set so closely that the static flow component dominates and the fluid flows virtually completely through the larger partial cross sections.

FIGS. 4-6b show a further embodiment of a flow straightener 9 according to the invention, the same designations being used as far as possible for the same components. Here, too, an outer ring 10 is provided, in which vanes 11, 12 are in turn arranged in two offset planes. The vanes 11, 12 are arranged parallel to one another respectively in the middle vane portions 11a, 12a, while the peripheral vane portions 11b, 12b run away angled thereto. As can be seen, the vane portions 11b and 12b of the two middle vanes 11, 12 run toward one another (see FIG. 4), while the vane portions 11b, 12b of the peripheral pairs of vanes 11, 12 run away from one another. Here, too, the complete flow cross section Q is subdivided into a multiplicity of individual partial cross sections $TQ_1$, $TQ_2$, $TQ_3$. The cross-sectional subdivision additionally takes place by way of a holding crosspiece 14, to which all the vanes 11, 12 are connected. The partial cross sections formed to the left and right of the holding crosspiece are mirror images of one another, this also applying to the partial cross sections considered as it were vertically; this means that the upper and lower partial cross sections $TQ_1$ are also of the same size. The same applies correspondingly to the partial cross sections $TQ_2$.

Figure 4:
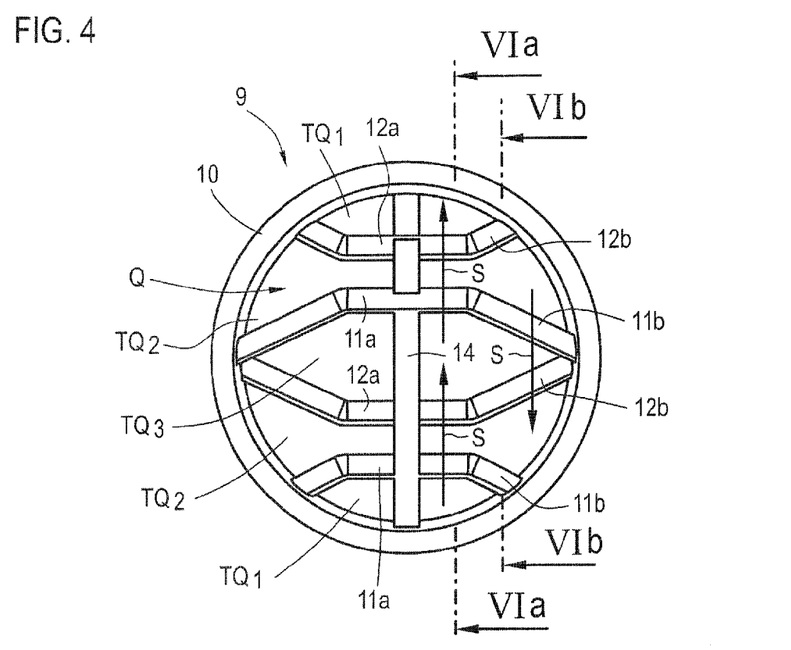
FIG. 4 shows a basic representation of a flow straightener according to the invention of a second embodiment.

Since the vanes 11, 12 are also longer here than they are wide, a swirling of the laminar flow also occurs in the case of this configuration because of the partial cross sections of different sizes. In addition, here the onflow surfaces 15 of all the vanes 11, 12 are beveled or rounded, which lowers the flow resistance and lends the flow an additional directional component.

Here, too, a "staircase formation" is in turn produced, but this changing locally when considered over the cross section.

Figure 6A:
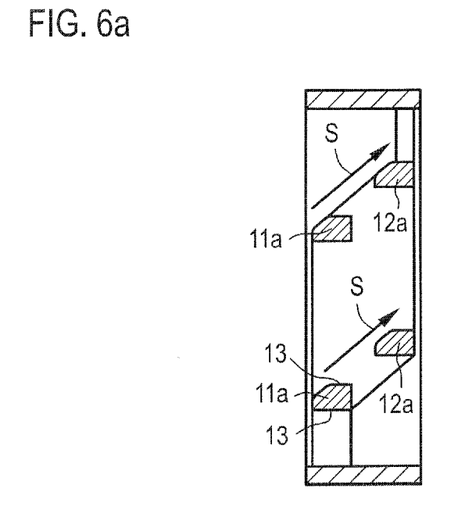
Figure 6B:
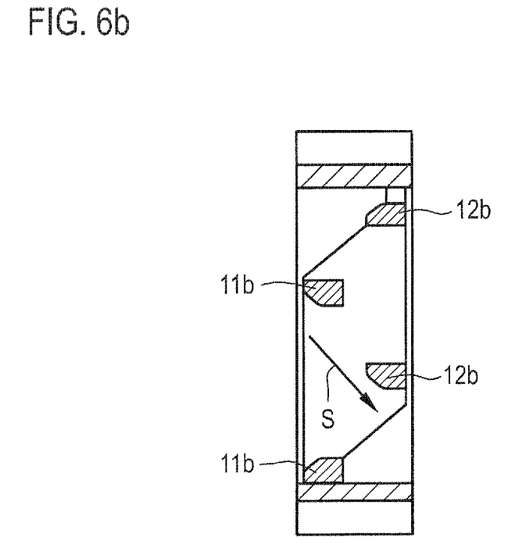

FIGS. 6a and 6b show sectional views through different planes VIa and VIb. FIG. 6a shows a sectional view through the region of the parallel vane portions 11a, 12a. As can be seen, here there form as it were two staircase configurations, which guide the flow S "upward" in FIG. 6a, consequently therefore lend a directional component in the direction of the inner wall of the pipe.

In the sectional plane through the vane portions 11b, 12b (FIG. 6b), only one "staircase configuration" is obtained, by the middle vane portions 11b, 12b. There, the flow S is guided "downward". Therefore, within one half of the flow straightener an "upwardly" directed flow deflection in the middle region and a "downward" flow deflection are obtained, consequently therefore a kind of circulation, as shown by the arrows S in FIG. 4. In the left-hand half of the flow straightener, this circulation is in the opposite direction, so that ultimately two contradirectional swirlings or swirls form.

Figure 5:
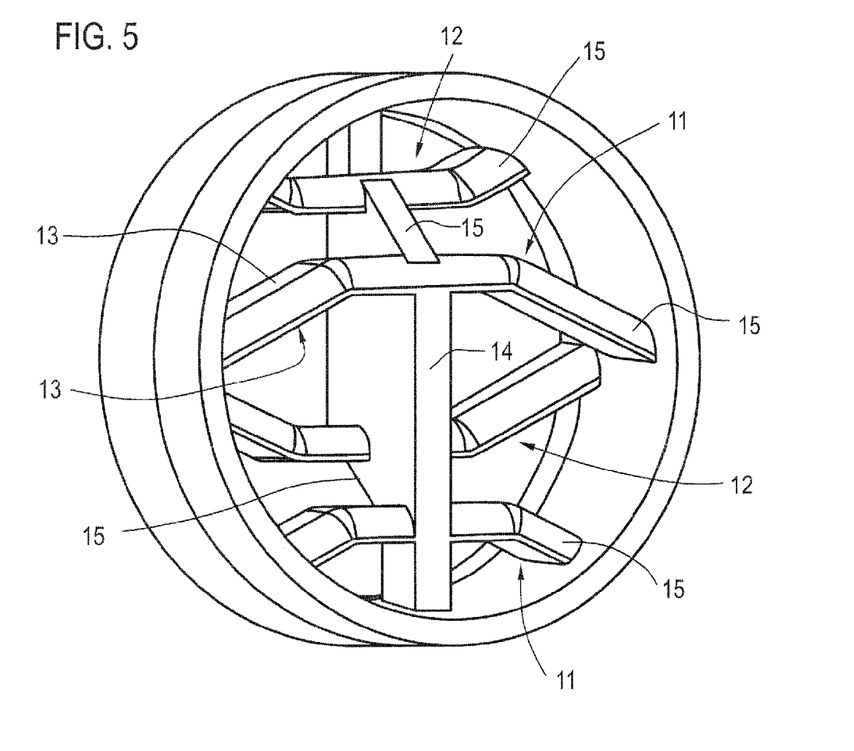
FIG. 5 shows a perspective view of the flow straightener from FIG. 4, FIGS. 6a, 6b show two longitudinal sectional views through the flow straightener from FIG. 4 in the direction of the lines VIa-VIa and VIb-VIb, respectively.

As FIG. 5 shows, the onflow edge of the holding crosspiece 14 is provided with a sloping surface 15. The same also applies correspondingly to the opposite edge of the holding crosspiece 14. A flow guidance likewise takes place thereby. The lateral surfaces 13 of each vane are, as in the case of all configurations, respectively parallel to one another and parallel to the main direction of flow.

Figure 7:
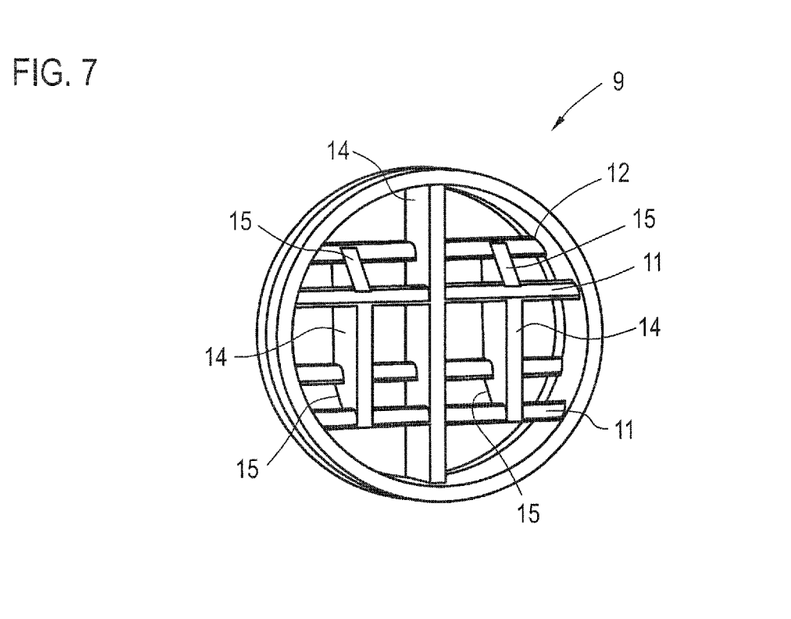
FIG. 7 shows a perspective view of a further flow straightener according to the invention.

FIG. 7 shows a further embodiment according to the invention of a flow straightener 9, which corresponds with regard to the arrangement of the vanes 11, 12 to the configuration according to FIGS. 2 and 3. Here, however, a middle holding crosspiece 14 and two further holding crosspieces 14 provided offset thereto are additionally provided, said crosspieces having sloping surfaces 15 on their onflow edges and the opposite outflow edges in a way similar to the middle holding crosspiece 14 according to FIG. 5. Here, too, when considered in cross section, a multiplicity of individual partial cross sections TQ form, the number of partial cross sections being even greater than in the case of the configurations described above because of the formation of three holding crosspieces; nevertheless, however, some of the cross-sectional areas of the individual partial cross sections once again differ.

Figure 8:
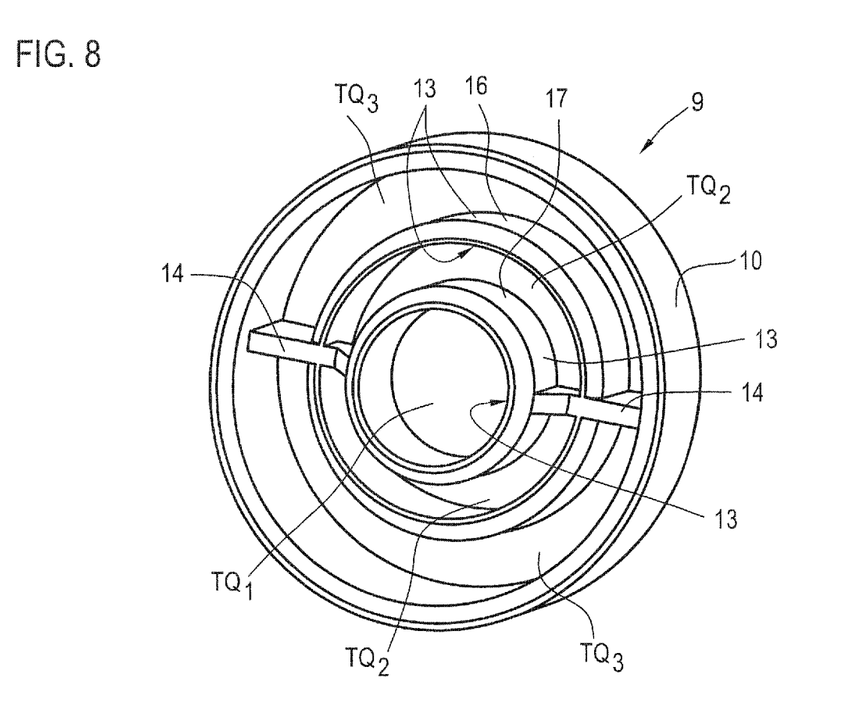
FIG. 8 shows a perspective view of an embodiment of a flow straightener according to the invention with annular vanes.
Figure 9:
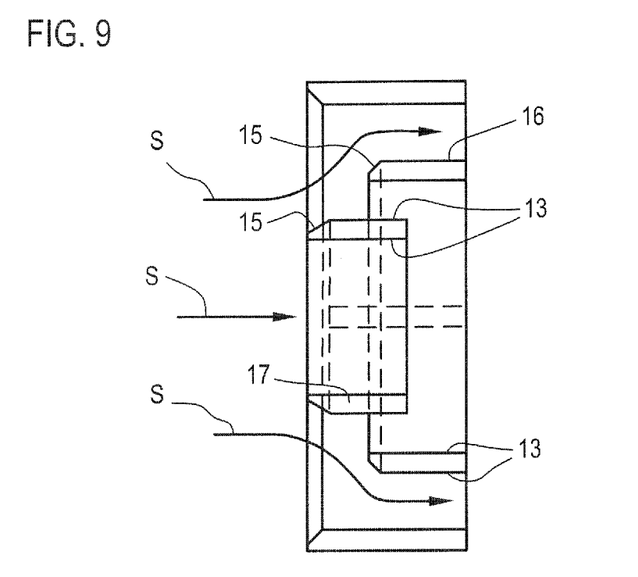
FIG. 9 shows a longitudinal sectional view of the flow straightener from FIG. 8.

FIG. 8 shows a further configuration according to the invention of a flow straightener 9 comprising an outer ring 10, by way of which the flow straightener 9—like all other flow straighteners too—lies against the inner wall of the flow pipe 2 from FIG. 1. In the example shown, two annular vanes 16, 17, which are provided concentrically in relation to one another and are fixed by way of two holding crosspieces 14, are provided in this ring 10. As FIG. 9 reveals, the two annular vanes 16, 17 are arranged offset to one another axially, that is in the main direction of flow; they are therefore positioned in two planes. As can be seen, here too in turn a multiplicity of different partial cross sections form, to be specific a middle first partial cross section $TQ_1$, followed by two partial cross sections $TQ_2$ in the form of segments of a ring, formed between the two annular vanes 16, 17, which in turn are followed radially further outward by two partial cross sections $TQ_3$, which are the largest and are formed between the outer annular vane 16 and the outer ring 10. Here, too, the onflow end faces are in turn provided with sloping surfaces 15, see FIG. 9. It can be seen, see FIG. 9 in particular, that a staircase structure is obtained, that is to say that the flow S is guided radially outward by way of the radially outwardly rising end edges or vanes 16, 17 provided one after the other when considered axially, while in the middle region the flow S flows straight through. In principle, therefore, here too a swirling resulting from differentiating flow directions is realized in addition to the swirling resulting from the partial cross sections $TQ_1$-$TQ_3$ of different sizes and the resultant different flow rates or flow velocities of the individual partial-cross-section-related fluid masses. Therefore, the disproportionate increase in the core flow of the laminar flow profile or the laminar flow thereof can be counteracted here, since the flow is deflected toward the pipe wall.

Figure 10:
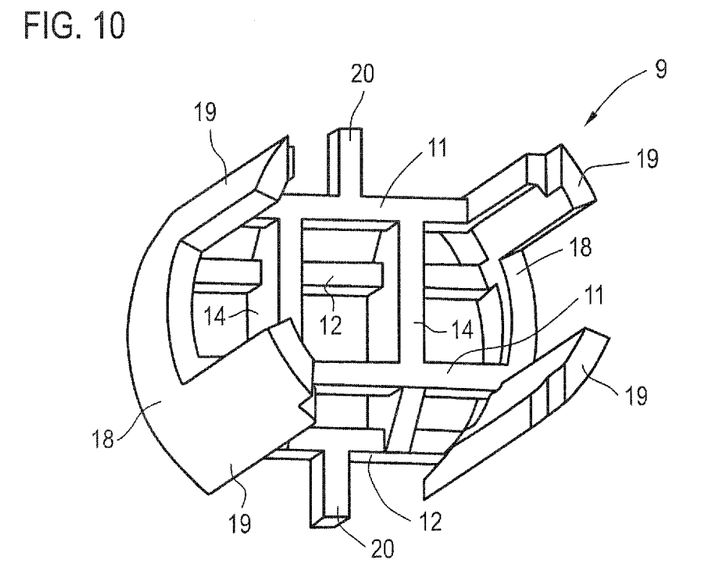
FIG. 10 shows a further embodiment of a flow straightener according to the invention.

FIG. 10 shows a further configuration of a flow straightener 9, in the case of which the axially considered offset vanes 11, 12 are not arranged in a completely closed outer ring, unlike in the case of the previous embodiments, but rather only two peripheral vanes 18 in the form of segments of a circle are provided here, provided on which are axially extended abutting portions 19, by way of which an abutment over a greater surface area is obtained on the inner wall of the pipe. Otherwise, the construction is similar to that of the configuration that is shown in FIG. 7, though here only two holding crosspieces 14 are provided, while on the two outer vanes 11, 12 only short vane portions 20 are provided for support on the inner wall of the pipe.

Figure 11:
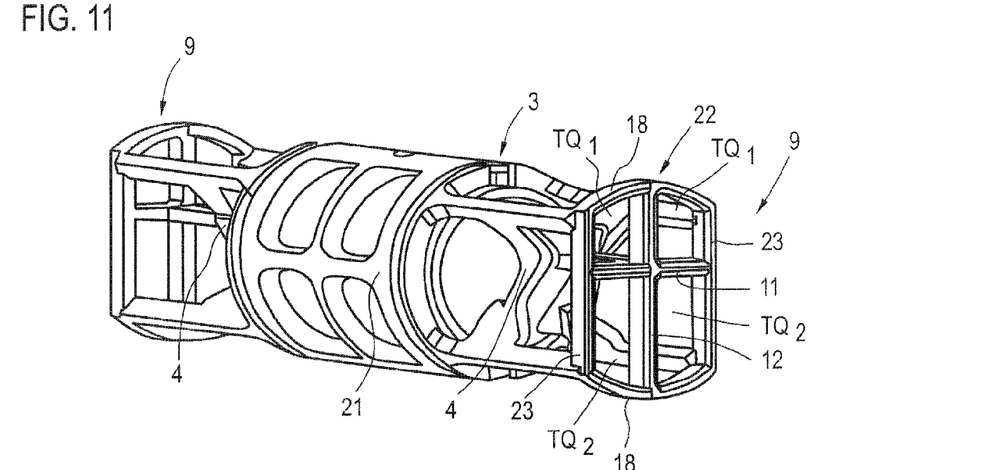
FIG. 11 shows a perspective view of a pipe insert, as shown in FIG. 1, with a flow straightener of a further embodiment arranged on it.

Finally, FIG. 11 shows a pipe insert 3, as already shown in FIG. 1, in the form of a detailed perspective view. Shown are the two reflector holders 4, as well as a middle, cylindrical holding portion 21, into which the measuring pipe 5 is inserted. Molded integrally on the pipe insert 3, which is formed as a plastic molding or plastic injection molding (or alternatively also arranged by way of latching portions), at the inflow end 22 is a flow straightener 9, which here has two crossing vanes 11, 12, the vane 11 being fixed to two peripheral vanes 18 in the form of segments of a circle, which for their part are peripherally connected to one another by way of further vanes 23. These further vanes 23 form a partial cross section with the neighboring inner wall of the pipe itself, while, on account of the crossing arrangement of the vanes 11, 12, which do not intersect one another in the middle but off-center, partial cross sections $TQ_1$ and $TQ_2$ of different sizes in turn form, while third partial cross sections that are not specifically shown here are formed neighboring the peripheral vanes 23. These partial cross sections are once again of different sizes, so that the advantageous swirling effects described at the beginning occur. It would also be conceivable to offset the vanes as a whole somewhat toward one side of the pipe wall, so that the two outer vanes form partial cross sections of different sizes with the respectively neighboring inner wall of the pipe.

In the example shown, a further flow straightener 9 is provided on the opposite side for reasons of symmetry. This may be formed there, but does not have to be.

If the flow straightener 9 is not molded in one piece on the pipe insert 3 or produced together with the latter, it is possible to produce it as a separate component and arrange it on the pipe insert 3. For this purpose, suitable latching or clamping portions can be provided on the flow straightener and/or on the pipe insert, making fixing possible. However, an embodiment of the flow straightener as a plastic component is not absolutely necessary, it would also be conceivable to form it from metal.

Figure 12:
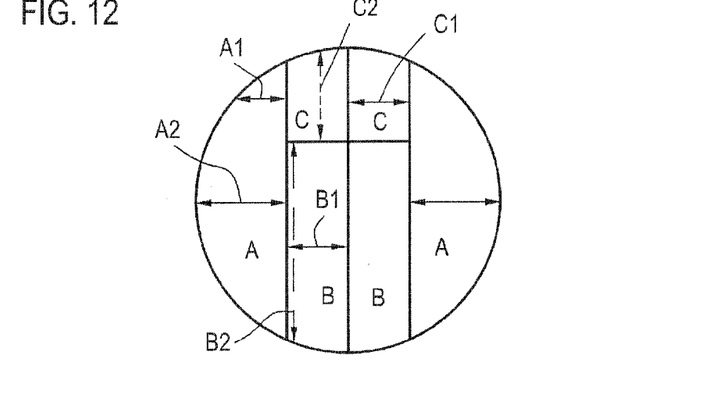
FIG. 12 shows a representation of the partial cross sections of the flow straightener from FIG. 11.

FIG. 12 shows as a basic diagram the flow cross sections that are formed by the flow straightener from FIG. 11. The Reynolds effective distances or geometries can be seen from this. With a rectangular contour, these distances are usually the narrow sides, that is the "short widths". In the partial cross section A, the distance A1 in the region of the corners is less than in the middle (distance A2), which has the effect that much less fluid flows through in the narrower region in comparison with the wider region. The distance A2 is the determining distance for the partial cross section A. With the ratio B1 or C1 to A2, the flow can be concentrated more in the middle or to the side (laminar flow case). With the ratio B1/A2=1 there is no effect. The same applies to C2 to B2, where C2 has a stronger effect, since C1/C2 are virtually equal. It generally applies that, with substantially rectangular partial cross-sectional geometries, neighboring partial cross sections should have different lengths and/or widths, therefore that they have different Reynolds effective geometries.

Figure 13:
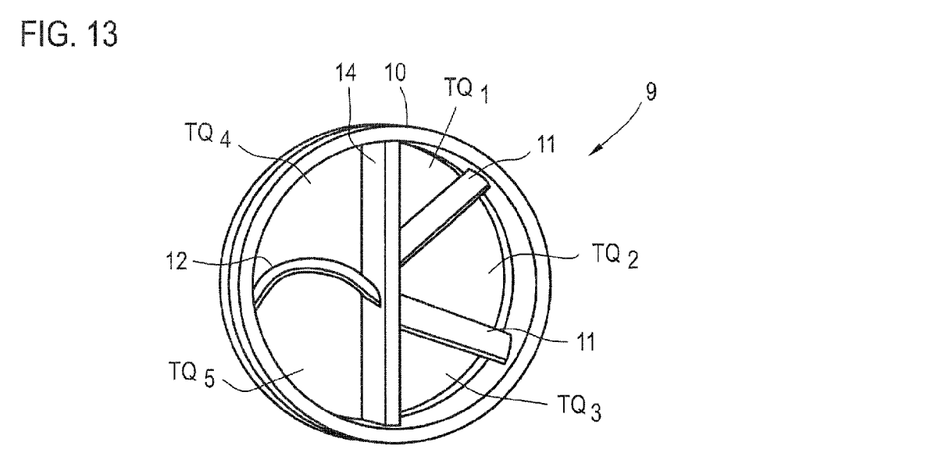
FIG. 13 shows a further embodiment according to the invention.

Furthermore, FIG. 13 shows an embodiment of a flow straightener 9 with an outer ring 10 and a middle holding crosspiece 14, on which, on the right side of the illustration, two vanes 11 are arranged and guided to the ring 10, so that on this side three partial cross sections $TQ_1$, $TQ_2$ and $TQ_3$ of different sizes form, while on the left half a bent vane 12 is provided, by way of which two further partial cross sections $TQ_4$ and $TQ_5$ are formed. These vanes too, like all the other vanes of the other embodiments described, are also longer than they are wide and, like all the other vanes, also have side surfaces that are parallel to one another and parallel to the main direction of flow H. It can be seen that here all the vanes 11, 12 are therefore at different angles to one another and to the holding crosspiece, so that five partial cross sections are obtained here, all of different sizes. Even if no staircase formation is realized here, such a formation would nevertheless be conceivable, in that corresponding additional vanes arranged in parallel are realized slightly offset in a plane lying downstream thereof.

The exemplary embodiments shown are not exhaustive, but rather any desired variations within the concept of the invention are possible.

Figure 14:
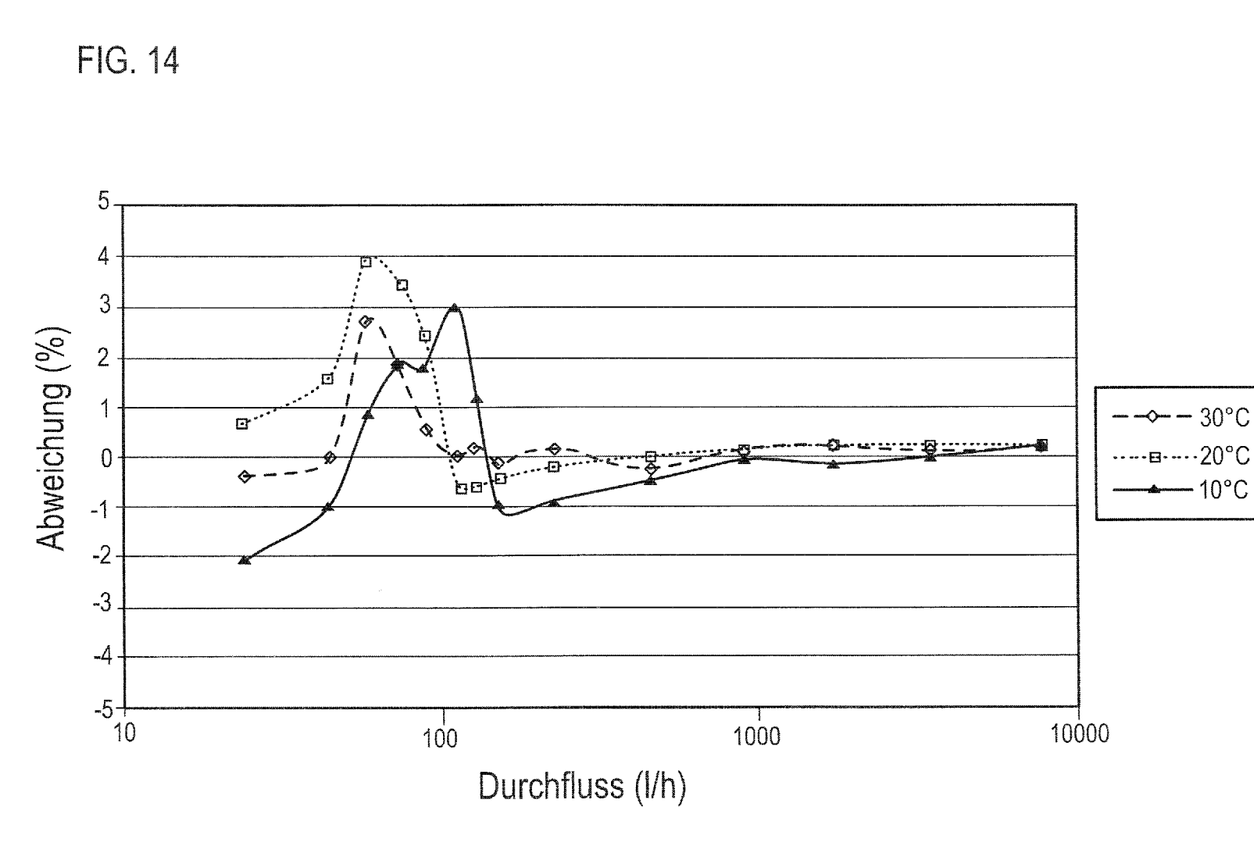
FIG. 14 shows a measuring diagram to represent the measuring deviations without the use of a flow straightener.
Figure 15:
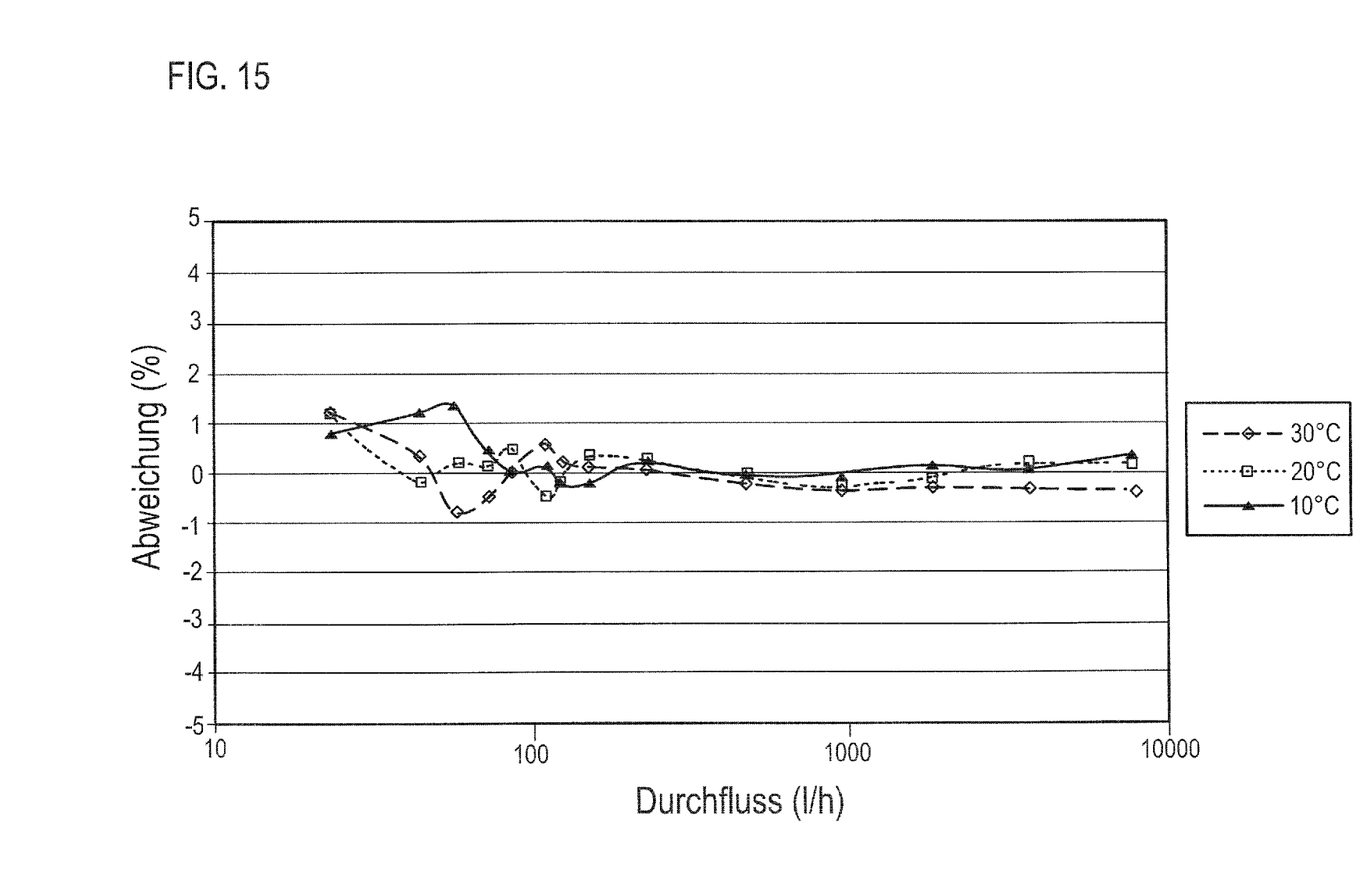
FIG. 15 shows a measuring diagram with the use of a flow straightener.

FIGS. 14 and 15 show two measuring diagrams, determined for the given measuring inaccuracies of a flowmeter without and with use of a flow straightener according to the invention. For recording the curves as shown in FIG. 14, a pipe insert, as shown in FIG. 11, was fitted into a flow pipe, but without the two end flow straighteners. The inside diameter of the measuring pipe 5 was 16 mm, the inside diameter of the flow pipe into which the pipe insert was fitted was 24 mm. The flow measurement took place by way of ultrasonic sensors which were arranged on both reflector mountings and communicate with the meter or the meter electronics. The through-flow of water at a temperature of 10° C., 20° C. and 30° C. was measured. The flow profile was not disturbed, since no flow straightener was used. As can be seen, the measurement curves in the diagram that is shown in FIG. 14, in which the through-flow is plotted along the x axis and the measuring deviation is plotted along the y axis, clearly show that greater measuring inaccuracies occur in particular in the case of a through-flow between 50 and 200 l/h. These great inaccuracies are attributable to the transition from laminar flow to turbulent flow. With an undisturbed flow profile, the transition from laminar flow to turbulent flow may also take place abruptly, which may lead to undesired strong measuring deviations.

The situation is different in FIG. 15, where the measurement curves are represented for when a pipe insert (inside diameter of the measuring tube likewise 16 mm) as shown in FIG. 11 is used. Here there are two flow straighteners, with which the flow profile has been deliberately disturbed. It is evident that, especially in the transitional region from laminar flow to turbulent flow, that is in the region of lower through-flows, a major improvement in the measuring accuracy can be achieved by the flow disturbance. The measuring accuracy in the region of greater through-flows, that is in the region of turbulent flow, is not appreciably influenced by the use of the flow straighteners.

The invention claimed is:

1. Flow straightener for a flowmeter, which can be fitted into a flow pipe upstream of or in the flowmeter and through which the fluid to be measured flows with a main direction of flow, comprising a number of vanes, which each have surfaces that are parallel to one another and, in the fitted position, run parallel to the main direction of flow of the fluid to be measured, the vanes being arranged in such a way that, in the fitted position, the flow cross section of the fluid-carrying flow pipe is subdivided into a number of partial cross sections, at least some of the partial cross sections being of different sizes, wherein the vanes have a bevel on their onflow side.

2. Flow straightener according to claim 1, wherein the vanes are longer than they are wide when considered in the main direction of flow.

3. Flow straightener for a flowmeter, which can be fitted into a flow pipe upstream of or in the flowmeter and through which the fluid to be measured flows with a main direction of flow, comprising a number of vanes, which each have surfaces that are parallel to one another and, in the fitted position, run parallel to the main direction of flow of the fluid to be measured, the vanes being arranged in such a way that, in the fitted position, the flow cross section of the fluid-carrying flow pipe is subdivided into a number of partial cross sections, at least some of the partial cross sections being of different sizes, wherein the vanes are arranged in two or more cross-sectional planes lying one behind the other.

4. Flow straightener according to claim 3, wherein the vanes have a bevel on their onflow side.

5. Flow straightener according to claim 3, wherein the vanes arranged in planes lying one behind the other run parallel to one another, at least in certain portions.

6. Flow straightener according to claim 5, wherein the vanes run parallel to one another in their middle region and the adjacent vane portions of two vanes lying one behind the other run at an angle to one another.

7. Flow straightener according to claim 3, wherein at least one holding crosspiece running substantially perpendicular to the vanes or vane portions that are parallel to one another is provided, to which crosspiece the vanes or vane portions are connected.

8. Flow straightener according to claim 7, wherein the holding crosspiece has at least over certain portions on the onflow side and/or the opposite side a sloping surface running at an angle <90° to the main direction of flow.

9. Flow straightener for a flowmeter, which can be fitted into a flow pipe upstream of or in the flowmeter and through which the fluid to be measured flows with a main direction of flow, comprising a number of vanes, which each have surfaces that are parallel to one another and, in the fitted position, run parallel to the main direction of flow of the fluid to be measured, the vanes being arranged in such a way that, in the fitted position, the flow cross section of the fluid-carrying flow pipe is subdivided into a number of partial cross sections, at least some of the partial cross sections being of different sizes, wherein at least some of the vanes are formed as concentric circles connected to at least one holding crosspiece.

10. Flow straightener for a flowmeter, which can be fitted into a flow pipe upstream of or in the flowmeter and through which the fluid to be measured flows with a main direction of flow, comprising a number of vanes, which each have surfaces that are parallel to one another and, in the fitted position, run parallel to the main direction of flow of the fluid to be measured, the vanes being arranged in such a way that, in the fitted position, the flow cross section of the fluid-carrying flow pipe is subdivided into a number of partial cross sections, at least some of the partial cross sections being of different sizes, wherein the vanes are formed straight or bent and are connected to at least one holding crosspiece, the straight vanes being at any desired angle >0° and <180° to the holding crosspiece.

11. Flow straightener according to claim 1, wherein the vanes are accommodated in a ring delimiting the flow straightener on the outside.

12. Flow straightener for a flowmeter, which can be fitted into a flow pipe upstream of or in the flowmeter and through which the fluid to be measured flows with a main direction of flow, comprising a number of vanes, which each have surfaces that are parallel to one another and, in the fitted position, run parallel to the main direction of flow of the fluid to be measured, the vanes being arranged in such a way that, in the fitted position, the flow cross section of the fluid-carrying flow pipe is subdivided into a number of partial sections, at least some of the partial cross sections being of different sizes, wherein the vanes are fixed peripherally by way of two peripheral vanes in the form of segments of a circle arranged opposite one another.

13. Flow straightener for a flowmeter, which can be fitted into a flow pipe upstream of or in the flowmeter and through which the fluid to be measured flows with a main direction of flow, comprising a number of vanes, which each have surfaces that are parallel to one another and, in the fitted position, run parallel to the main direction of flow of the fluid to be measured, the vanes being arranged in such a way that, in the fitted position, the flow cross section of the fluid-carrying flow pipe is subdivided into a number of partial cross sections, at least some of the partial cross sections being of different sizes, wherein peripherally straight vanes are provided, which together make up a rectangular form and in the fitted position are supported on the flow pipe by way of abutting portions.

14. Flow straightener for a flowmeter, which can be fitted into a flow pipe upstream of or in the flowmeter and through which the fluid to be measured flows with a main direction of flow, comprising a number of vanes, which each have surfaces that are parallel to one another and, in the fitted position, run parallel to the main direction of flow of the fluid to be measured, the vanes being arranged in such a way that, in the fitted position, the flow cross section of the fluid-carrying flow pipe is subdivided into a number of partial cross sections, at least some of the partial cross sections being of different sizes, wherein at least some of the vanes end freely and, in the fitted position, lie with their ends against the flow pipe, or in that at least some of the vanes form a partial cross section together with the inner wall of the pipe.

15. Flow straightener according to claim 1, wherein the straightener is a plastic injection molding.

16. Flow straightener according to claim 1, wherein the straightener is arranged on a pipe insert serving for flow measurement.

17. Flow straightener according to claim 16, wherein the straightener is fitted on the pipe insert by way of a latching connection or is molded on it.

18. An ultrasonic metering device, with a flow pipe through which the fluid to be measured flows with a main direction of flow, and with at least one flow straightener according to claim 1 inserted in the flow pipe.

* * * * *